(No Model.)
C. B. QUICK.
PEANUT WARMER.
No. 261,762. Patented July 25, 1882.
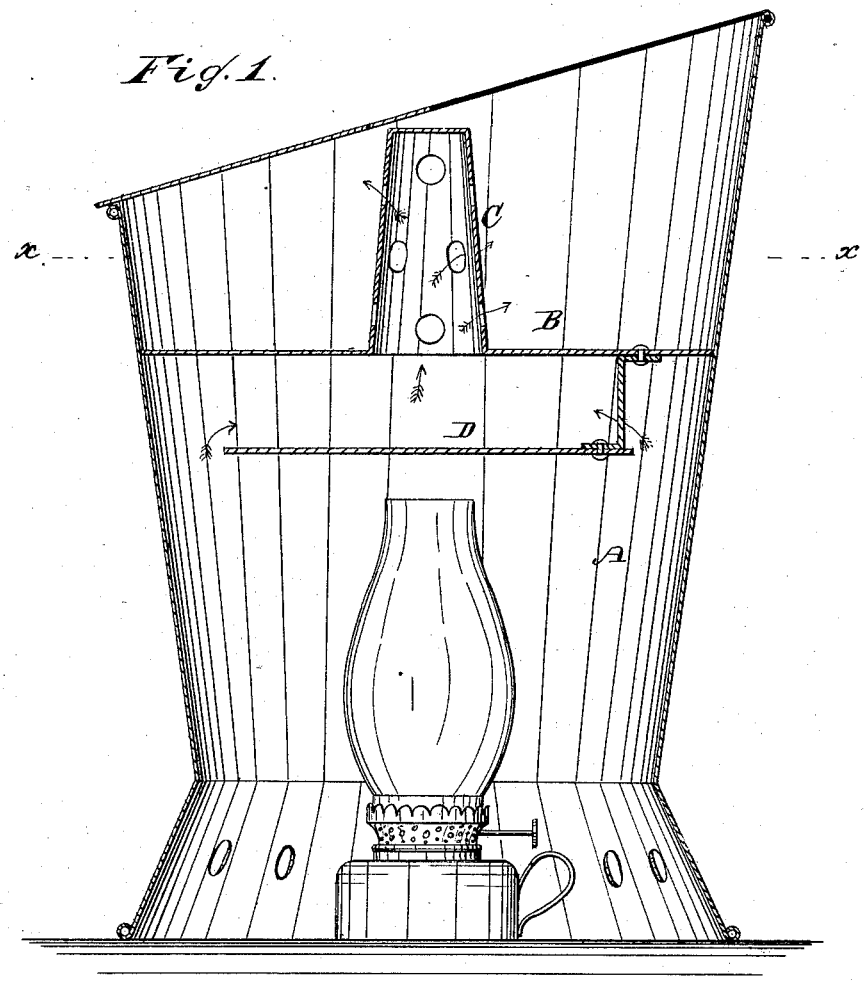
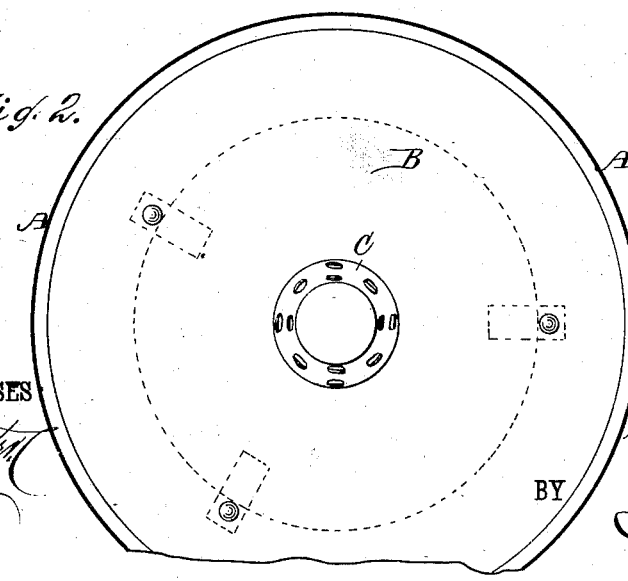
WITNESSES
INVENTOR:
C. B. Quick.
BY Munn & Co
ATTORNEYS.

UNITED STATES PATENT OFFICE.

CHARLES B. QUICK, OF PENN YAN, NEW YORK.

PEANUT-WARMER.

SPECIFICATION forming part of Letters Patent No. 261,762, dated July 25, 1882.

Application filed May 10, 1882. (No model.)

*To all whom it may concern:*

Be it known that I, CHARLES B. QUICK, of Penn Yan, in the county of Yates and State of New York, have invented a new and Improved Peanut-Warmer, of which the following is a full, clear, and exact description.

My invention consists in the combination, with a warming-pan, of a perforated tube for receiving the heat from a lamp to keep the contents of the pan warm, in such manner as equally to distribute the heat and to prevent smoke and odors.

The device is a substitute for steam-tables or steam-warmers of any kind, and may be used for bakers' show-tables, carving-tables, warming-tables, &c.

Reference is to be had to the accompanying drawings, forming a part of this specification, in which similar letters of reference indicate corresponding parts in both the figures.

Figure 1 is a vertical section of my apparatus. Fig. 2 is a horizontal section.

A is a hollow cylindrical case, of metal, constructed in the lower portion to receive a lamp, and fitted with a removable pan, B, upon which the nuts are to be placed.

C is a tube fitted at the center of the table, and extending upward to the top of the case A.

D is a deflector attached to the under side of pan B, beneath the opening to tube C, so as to equally distribute the heat.

The tube C is perforated, and by its position will receive the heated air from the space below the pan and convey the same through the materials on the pan and surrounding the tube. The tube creates a draft, so that the heat is equally distributed throughout the whole contents of the pan.

The case A will be provided with a suitable cover, formed partly of glass and hinged to the case.

Having thus described my invention, I claim as new and desire to secure by Letters Patent—

1. The warmer consisting of the case A and the pan B, provided with the perforated tube C and deflector D, substantially as shown and described.

2. The pan B, provided with the perforated tube C, having the upper end closed, and the deflector D, secured to the under side of the pan, substantially as shown and described.

CHARLES BRADLEY QUICK.

Witnesses:
GEO. R. YOUNGS,
DELOS A. BELLIS.